United States Patent [19]
Koh et al.

[11] Patent Number: 5,729,407
[45] Date of Patent: Mar. 17, 1998

[54] ROTARY HEAD DRUM WITH INTEGRATED YOKE AND VIBRATION RESISTANT BASE

[75] Inventors: Young Gil Koh, Gyung Gi-Do; Sung Hwan Hong, Seoul; Yong Chai Choi, Gyung Gi-Do, all of Rep. of Korea

[73] Assignee: Goldstar Co., Ltd., Seoul, Rep. of Korea

[21] Appl. No.: 621,322

[22] Filed: Mar. 25, 1996

Related U.S. Application Data

[63] Continuation of Ser. No. 340,433, Nov. 14, 1994, abandoned, which is a continuation of Ser. No. 76,852, Jun. 15, 1993, abandoned.

Foreign Application Priority Data

Jun. 20, 1992 [KR] Rep. of Korea ............... 10784/1992

[51] Int. Cl.⁶ ............................. G11B 5/52; G11B 21/04
[52] U.S. Cl. ............................. 360/107; 360/130.23
[58] Field of Search ............................. 360/107, 108, 360/84, 85, 81, 101, 87, 70, 130.21, 130.22, 130.23, 130.24

[56] References Cited

U.S. PATENT DOCUMENTS

| | | | |
|---|---|---|---|
| 4,654,738 | 3/1987 | Kato et al. | 360/108 |
| 4,890,177 | 12/1989 | Katoh et al. | 360/107 |
| 4,939,607 | 7/1990 | Saito | 360/107 |
| 5,021,908 | 6/1991 | Morimoto et al. | 360/107 |
| 5,151,839 | 9/1992 | Ota | 360/108 |

FOREIGN PATENT DOCUMENTS 3-296909  12/1991  Japan.

*Primary Examiner*—Stuart S. Levy
*Assistant Examiner*—David L. Ometz

[57] ABSTRACT

A rotary head drum of a magnetic recording/playback apparatus having a back yoke integrated with a ring collar. The head drum includes a rotatable shaft, an upper rotary drum and a lower stationary drum which are mounted on upper and lower parts of the rotatable shaft, respectively. The back yoke integrated with the ring collar is mounted about the rotatable shaft under the lower stationary drum. The ring collar maintains a predetermined gap between a motor stator and a motor rotor. The motor stator is mounted about the rotatable shaft under the back yoke and the motor rotor is mounted on a lower surface of the ring collar. The motor housing is mounted on a lower surface of the lower stationary drum and made of a plastic material for absorbing a vibration.

3 Claims, 4 Drawing Sheets

ROTARY HEAD DRUM WITH INTEGRATED YOKE AND VIBRATION RESISTANT BASE

This application is a continuation of application Ser. No. 08/340,433 filed on Nov. 14, 1994 now abandoned, which is a continuation application of Ser. No. 08/076,852 filed Jun. 15, 1993, now abandoned.

FIELD OF THE INVENTION

The present invention relates to a rotary head drum applied to magnetic recording/playback apparatus, such as a camcorder, a video cassette recorder (VCR) or a digital audio tape recorder (DAT), to record a video signal and an audio signal on a magnetic tape and to play back the signals.

BACKGROUND OF THE INVENTION

With reference to FIG. 1, there is shown conventional magnetic recording/playback apparatus having a rotary head drum. As shown in the drawing, the magnetic recording/playback apparatus liftably supports a tape cassette 1, which is provided with a tape supply reel 2 and a tape take-up reel 3 having a magnetic tape 8 extending therebetween, by its cassette holder (not shown). The recording/playback apparatus also includes a pair of guide rollers 4 and 5, a pair of slant posts 6 and 7, a rotary head drum 9, a pinch roller 10, a capstan shaft 11 and a plurality of guide members 12, 13 and 14.

The rotary head drum 9 is noted as a very important element in determining the performance of the recording/playback apparatus. That is, the drum 9 directly influences the picture quality of the recording/playback apparatus since it records a video signal and an audio signal on the tape 8, being guided under the condition that it comes into direct contact with a circumferential surface of the drum 9, and plays back the recorded signals.

The rotary head drum 9 comprises, as shown in FIG. 2, a rotatable shaft 15 around which a flange 16 is tightly inserted to be fixed thereto. An upper rotary drum 17 is mounted on an upper surface of the flange 16 by means of a plurality of set screws 18, while a transrotor 19 is mounted on a lower surface of the flange 16.

Under the upper rotary drum 17, a lower stationary drum 20, having a shaft hole 21 of an inner diameter larger than the outer diameter of the shaft 15, is tightly inserted around the shaft 15 with upper and lower radial bearings 22 and 23 fitted around the shaft 15 at the upper and lower parts of the shaft hole 21, respectively. The lower stationary drum 20 also includes, at its upper surface, a transistor 24 facing and corresponding to the transrotor 19 of the upper drum 17. A motor housing 25 is fixed to a lower surface of the lower stationary drum 20 by a set screw 34.

In addition, a conical washer 26, a back yoke 28, a spacer 35, a motor stator 30, a ring collar 27 and a motor rotor 32 are inserted around the lower part of the rotatable shaft 15, downwardly protruding from the lower stationary drum 20, one after another. The ring collar 27 fitted around the rotatable shaft 15 is slidably inserted in the back yoke 28 and fixed to the shaft 15 by means of a set screw 29. The conical washer 26 interposed between the lower stationary drum 20 and the back yoke 28 is elastically deformed to elastically support the lower bearing 23 of the stationary drum 20.

The spacer 35 is interposed between the ring collar 27 and the annular back yoke 28 to allow the motor stator 30 to be always spaced apart from the motor rotor 32 by a predetermined gap "a". This gap "a" is noted as an important factor in determining of the motor performance.

The motor stator 30 is screwed to the lower surface of the motor housing 25 by a plurality of set screws 31, while the motor rotor 32 is inserted around the lowermost part of the shaft 15 and screwed to the ring collar 27 by a set screw 33.

However, the aforementioned rotary head drum 9 applied to the magnetic recording/playback apparatus has a disadvantage caused by the slidable insertion of the ring collar 27 in the annular back yoke 28. That is, the slidable insertion of the ring collar 27 in the back yoke 28 inevitably causes vibration and contact noise when the rotary head drum 9 rotates at a high speed. Also, the spacer 35 should be additionally used to maintain the precise gap "a" between the motor stator 30 and the motor rotor 32. Hence, it is difficult to assemble the head drum 9. Furthermore, an error generated in assemblage of the head drum 9 prevents the spacer 35 from being accurately positioned at its place so that the gap "a" cannot be maintained as desired, thereby deteriorating the total performance of the head drum 9. Also, the use of the additional elements, such as the spacer 35, increases the manufacturing cost of the rotary head drum. In addition, the use of the spacer 35 reduces the outer diameter of the ring collar 27 and deteriorates the screwing force of the set screw 29 which fixes this collar 27 to the shaft 15. In this regard, the ring collar 27 may be accidentally separated from the shaft 15 during operation of the head drum.

SUMMARY OF THE INVENTION

It is, therefore, an object of the present invention to provide a rotary head drum in which the aforementioned disadvantages can be overcome and which has a back yoke integrated with a ring collar, thereby preventing generation of vibration and contact noise during a high speed rotation of the head drum.

It is another object of the present invention to provide a rotary head drum which has no additional spacer for maintaining a gap between a motor stator and a motor rotor, thereby achieving accurate and easy assemblage of the head drum.

It is a further object of the present invention to provide a rotary head drum which has a ring collar having a larger outer diameter and, as a result, increases the screwing force of a set screw for fixing this ring collar to a rotatable shaft, thereby preventing the accidental separation of the ring collar due to the vibration generated by the rotation of the head drum.

To accomplish the above-mentioned objects, a rotary head drum of the present invention includes a rotatable shaft; an upper rotary drum and a lower stationary drum, said drums being mounted on upper and lower parts of the rotatable shaft, respectively; a back yoke integrated with a ring collar for maintaining a predetermined gap between a motor stator and a motor rotor, the back yoke being mounted about the rotatable shaft under the lower stationary drum; the motor stator being mounted about the rotatable shaft under the back yoke; the motor rotor being mounted on a lower surface of the ring collar; and a motor housing being mounted on a lower surface of the lower stationary drum and made of a vibration absorbing plastic material.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 3:
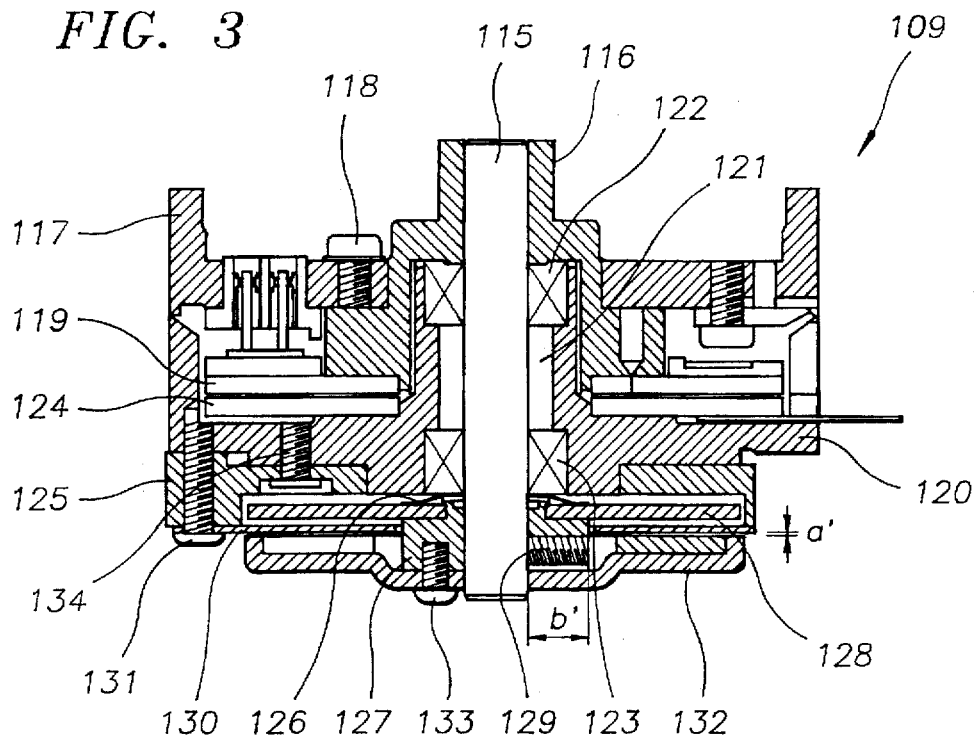
FIG. 3 is a sectional view of the rotary head drum showing a preferred embodiment of the present invention.
Figure 4:
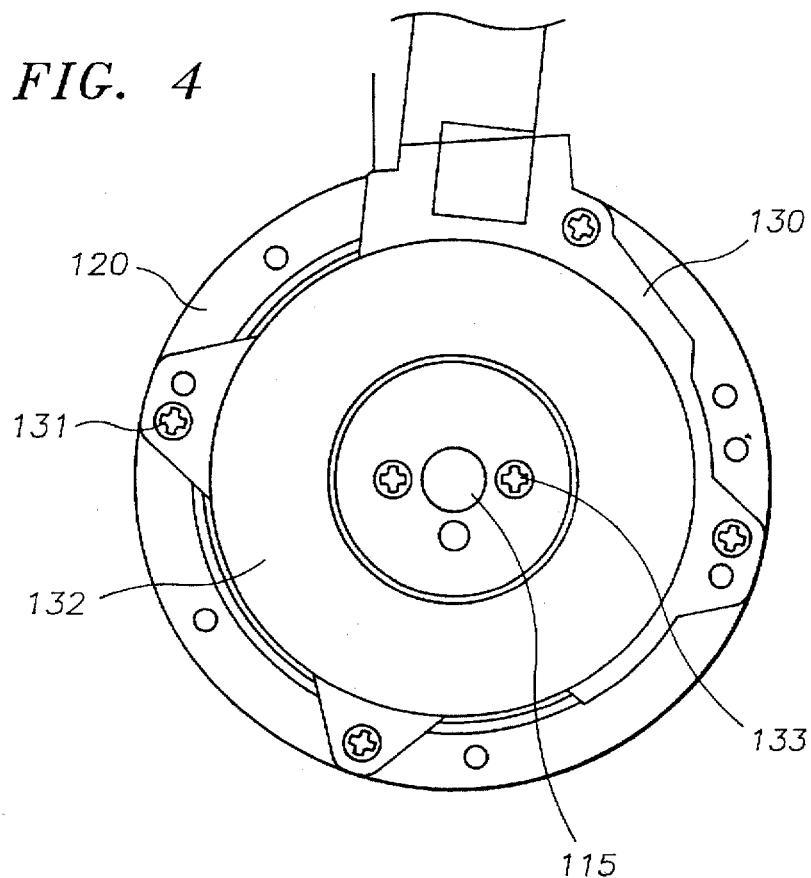
FIG. 4 is a bottom view of the rotary head drum of FIG. 3.
Figure 5:
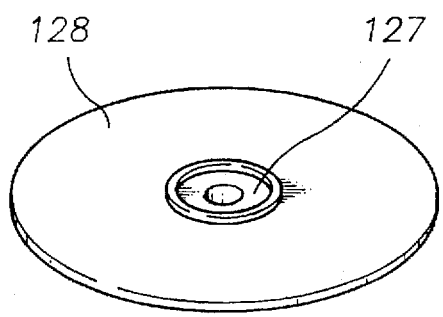
FIG. 5 is a perspective view of a back yoke integrated with a ring collar of the rotary head drum according to the present invention.

Referring to the drawings, the rotary head drum 109 of this invention comprises, as shown in FIG. 3, a rotatable shaft 115 having a flange 116 which is tightly inserted around the shaft 115 to be fixed thereto. An upper rotary drum 117 is mounted on an upper surface of the flange 116 by means of a plurality of set screws 118, while a transrotor 119 is mounted on a lower surface of the flange 116.

Under the upper rotary drum 117, a lower stationary drum 120 is tightly inserted around the shaft 115 with upper and lower radial bearings 122 and 123 which are fitted around the shaft 115 at the upper and lower parts of the shaft hole 121, respectively. The lower stationary drum 120 also includes, at its upper surface, a transistor 124 facing and corresponding to the transrotor 119 of the upper drum 117. A motor housing 125 is fixed to a lower surface of the lower stationary drum 120 by means of a set screw 134.

It is preferred to make the motor housing 125 by using a plastic material suitable for efficiently absorbing the vibration generated by operation of the head drum 109.

As described above, the lower stationary drum 120 is mounted on the rotatable shaft 115 of the upper rotary drum 117 in order to accomplish the assemblage of the upper and lower drums.

In addition, a conical washer 126 and a back yoke 128 integrated with a ring collar 127 are inserted around the lower part of the rotatable shaft 115, downwardly protruding from the lower stationary drum 120, one after another.

Figure 1:
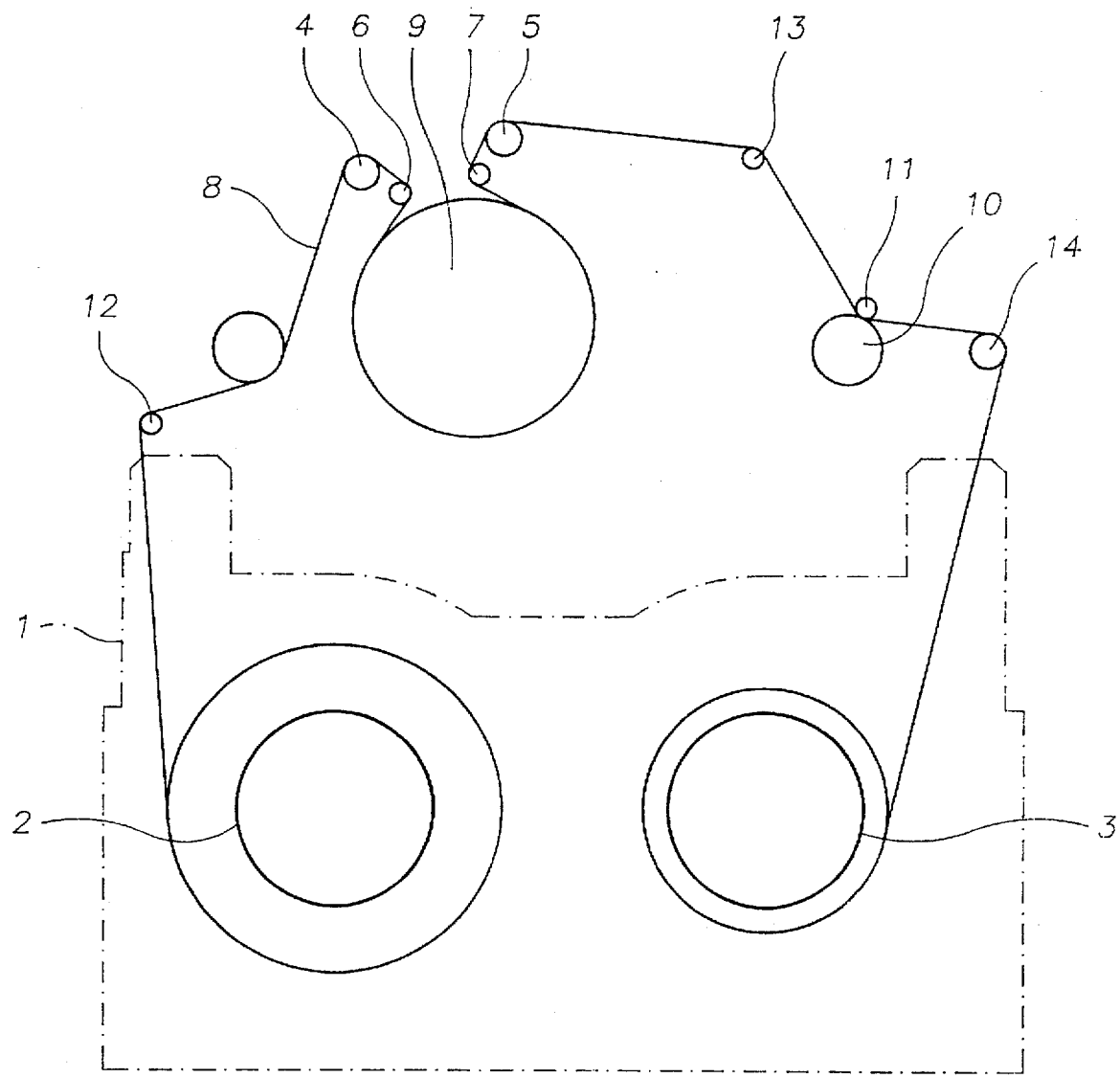
FIG. 1 is a schematic top plan view of a conventional magnetic recording/playback apparatus having a rotary head drum, showing its tape loading state.
Figure 2:
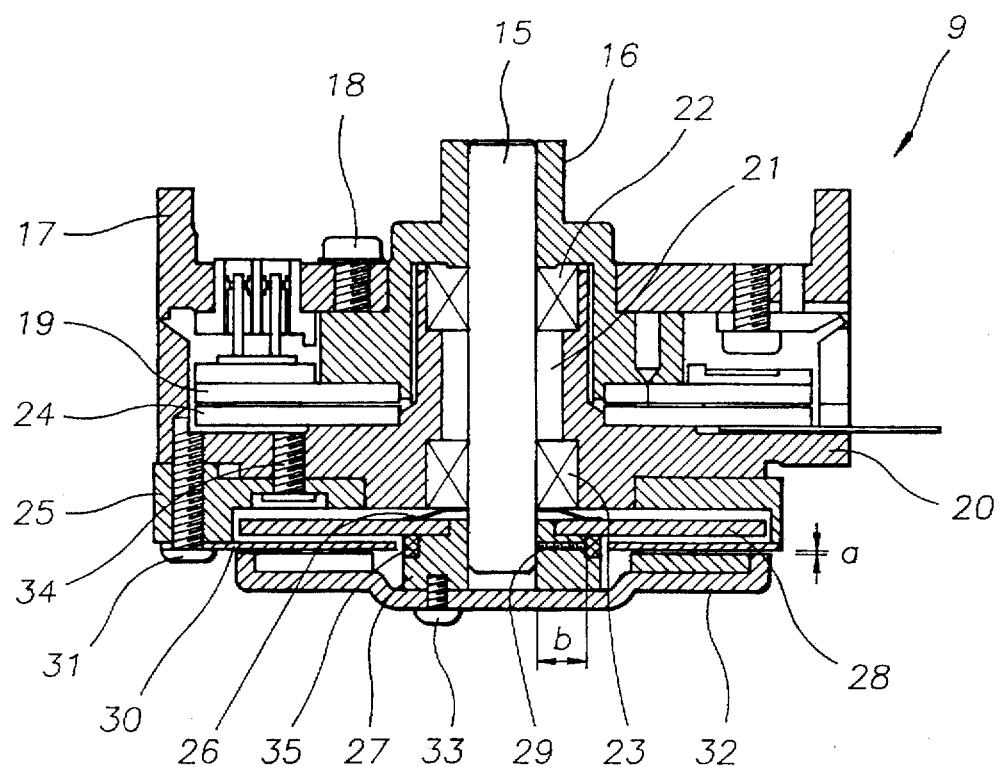
FIG. 2 is an enlarged sectional view of the conventional rotary head drum of FIG. 1.

The ring collar 127 of the back yoke 128 is fixed to the shaft 115 by a set screw 129. In this case, since there is provided no spacer 35 differently from the prior embodiment, the outer diameter "b'" of the ring collar 127 is relatively larger than that "b" of the ring collar 27 of FIG. 2, thereby increasing the screwing force of the set screw 129. The conical washer 126, which is interposed between the lower stationary drum 120 and the back yoke 128, is elastically deformed to elastically support the lower bearing 123 of the stationary drum 120.

The motor stator 130 is screwed to the lower surface of the motor housing 125 by using a plurality of set screws 131, while the motor rotor 132 is inserted around the lowermost part of the shaft 115 and screwed to the ring collar 127 by a set screw 133.

From the above description, it will be noted that the characterized part of the present invention is the back yoke 128 integrated with the ring collar 127.

This ring collar 127 integrated with the back yoke 128 also functions as a spacer for maintaining a predetermined gap "a'" between the motor stator 130 and the motor rotor 132.

Figure 6A:
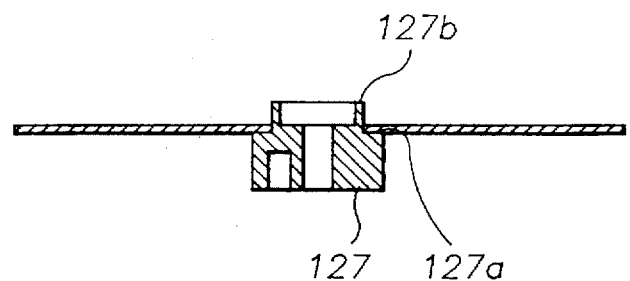
FIGS. 6A and 6B are sectional views of the back yoke integrated with the ring collar, showing assemblage thereof.
Figure 6B:
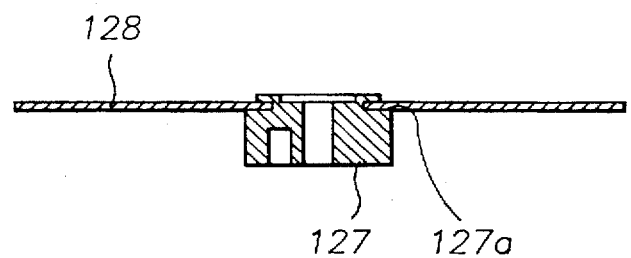

In integration of the back yoke 128 with the ring collar 127, the back yoke 128 is simply seated on a support step 127a of the ring collar 127 as depicted in FIG. 6A. In this state, an annular protrusion 127b of the ring collar 127 upwardly protruding from the back yoke 128 is outwardly bent by a conventional caulking as depicted in FIG. 6B and achieves the integration of the two elements 127 and 128. Of course, the integration of the back yoke 128 with the ring collar 127 may be achieved by another method which can provide a firm integration of the elements 127 and 128.

In addition, the motor housing 125, fixed to the lower surface of the stationary drum 120 by the set screw 134, is made of a plastic material capable of efficiently absorbing the vibration generated by the rotation of the upper rotary drum 117, thereby improving the stability of the head drum.

As described above, the present invention provides a rotary head drum having a back yoke integrated with a ring collar, the ring collar having a function as a spacer for maintaining a predetermined gap between a motor stator and a motor rotor, thereby facilitating the assemblage of the head drum and preventing generation of the vibration and the contact noise during the high speed rotation of the head drum. The ring collar integrated with the back yoke precisely maintains the gap between the motor stator and the motor rotor and, as a result, causes use of no conventional spacer, thereby simplifying the drum construction, reducing the manufacturing cost of the apparatus, and increasing the screwing force of a set screw which is screwed to the ring collar, Another advantage of the present invention is that the operational stability of the head drum improves since the motor housing is made of a plastic material suitable for absorbing the vibration.

Although the preferred embodiments of the present invention have been disclosed for illustrative purposes, those skilled in the art will appreciate that various modifications, additions and substitutions are possible, without departing from the scope and spirit of the invention as disclosed in the accompanying claims,

What is claimed is:

1. A rotary head drum including a rotatable shaft, an upper rotary drum and a lower stationary drum, said upper and lower drums being respectively mounted on upper and lower parts of said rotatable shaft, comprising:

a motor rotor being connected about the rotatable shaft and to a ring collar;

first means for securing a back yoke against the ring collar to form a single unitary body, said unitary body being mounted about said rotatable shaft with said back yoke positioned between a motor stator and said lower stationary drum;

second securing means, cooperating with said first securing means, for further securing the back yoke against the ring collar such that the combination of the first and second securing means improve the performance and durability of the rotary head drum by effectively reducing any vibration or other movement of the back yoke independent of the ring collar, said unitary body maintaining a small predetermined gap between the motor stator and the motor rotor, wherein a support step and an annular protrusion of the ring collar eliminate the need for spacers by assisting in maintaining the small predetermined gap.

2. A rotary head drum according to claim 1 further comprising a motor housing, mounted on a lower surface of said lower stationary drum, and being made of a plastic material for absorbing vibration.

3. The rotary head drum according to claim 1, wherein said second securing means comprises said back yoke being permanently integrated with said ring collar by inserting the annular protrusion of said ring collar into a central opening in said back yoke and bending said annular protrusion outwardly to rigidly connect said back yoke with said ring collar to form the unitary body.

* * * * *